US008321919B2

(12) United States Patent
Babeanu et al.

(10) Patent No.: US 8,321,919 B2
(45) Date of Patent: Nov. 27, 2012

(54) FRAMEWORK FOR DELEGATING ROLES IN HUMAN RESOURCES ERP SYSTEMS

(75) Inventors: Razvan Alexandre Babeanu, North Vancouver (CA); Justin Craig Field, New South Wales (AU); Renli Wang, Rochester, MN (US)

(73) Assignee: Oracle International Corp., Redwood Shores, CA (US)

( * ) Notice: Subject to any disclaimer, the term of this patent is extended or adjusted under 35 U.S.C. 154(b) by 925 days.

(21) Appl. No.: 12/170,130

(22) Filed: Jul. 9, 2008

(65) Prior Publication Data
US 2009/0064280 A1 Mar. 5, 2009

Related U.S. Application Data

(60) Provisional application No. 60/970,217, filed on Sep. 5, 2007, provisional application No. 60/970,448, filed on Sep. 6, 2007.

(51) Int. Cl.
*G06F 7/04* (2006.01)
(52) U.S. Cl. .................................. 726/7; 726/3
(58) Field of Classification Search .............. 726/7, 3, 726/4–6
See application file for complete search history.

(56) References Cited

U.S. PATENT DOCUMENTS

| 6,247,026 B1* | 6/2001 | Waldo et al. .................. 1/1 |
| 6,847,957 B1 | 1/2005 | Morley |
| 7,035,910 B1 | 4/2006 | Dutta et al. |
| 7,321,864 B1 | 1/2008 | Gendler |
| 7,594,112 B2* | 9/2009 | Patrick et al. .............. 713/166 |
| 7,945,601 B2 | 5/2011 | Pallari et al. |
| 2003/0212615 A1 | 11/2003 | Whitehead et al. |
| 2003/0229522 A1 | 12/2003 | Thompson et al. |
| 2004/0083367 A1* | 4/2004 | Garg et al. .................. 713/170 |
| 2004/0122853 A1 | 6/2004 | Moore |
| 2005/0010859 A1 | 1/2005 | McDonough et al. |
| 2005/0033626 A1 | 2/2005 | Kruse et al. |
| 2005/0182941 A1 | 8/2005 | Della-Libera et al. |
| 2005/0246629 A1 | 11/2005 | Hu |

(Continued)

OTHER PUBLICATIONS

Gerald Vogt, "Delegation of Tasks and Rights", 2001, Munich Network Management Team-University of Technology Munich, Germany, Retrieved Date: Sep. 10, 2011.*

(Continued)

*Primary Examiner* — Samson Lemma
(74) *Attorney, Agent, or Firm* — Kilpatrick Townsend & Stockton LLP

(57) ABSTRACT

Embodiments presented herein provide transaction delegation systems and methods that allow a delegator to select any user to act as a proxy on that manager's behalf with respect to certain transactions. In embodiments, a manager is able to select different users to manage different transactions. A user can accept a proxy request and obtain the necessary security access when the delegation is active. Thus, the proxy user is able to approve and/or initiate the selected transactions even if the security for those transactions is higher than what the proxy user would normally have. In embodiments, an administrator is able to configure the delegations and can ensure that the delegated authority is revoked when the delegated authority expires.

14 Claims, 16 Drawing Sheets

U.S. PATENT DOCUMENTS

| | | | |
|---|---|---|---|
| 2005/0273365 | A1 | 12/2005 | Baumgartner et al. |
| 2006/0004662 | A1* | 1/2006 | Nadalin et al. ................... 705/50 |
| 2006/0020886 | A1 | 1/2006 | Agrawal et al. |
| 2006/0047555 | A1 | 3/2006 | Kang et al. |
| 2006/0173698 | A1 | 8/2006 | Morley |
| 2007/0094248 | A1 | 4/2007 | McVeigh et al. |
| 2007/0143860 | A1* | 6/2007 | Hardt .............................. 726/28 |
| 2007/0192679 | A1 | 8/2007 | Foushee et al. |
| 2007/0214491 | A1 | 9/2007 | Serani et al. |
| 2008/0046568 | A1 | 2/2008 | Broda et al. |
| 2008/0046803 | A1 | 2/2008 | Beauchamp et al. |
| 2008/0301296 | A1* | 12/2008 | York ............................ 709/225 |
| 2009/0006170 | A1* | 1/2009 | Smith ................................ 705/9 |
| 2009/0063240 | A1 | 3/2009 | Pallari et al. |
| 2009/0070365 | A1 | 3/2009 | Pallari et al. |
| 2009/0132996 | A1 | 5/2009 | Eldridge et al. |
| 2010/0106546 | A1 | 4/2010 | Sproule |

OTHER PUBLICATIONS

"Oracle XML Publisher—User's Guide Release 11$i$", Feb. 2006, Oracle, 398 pages.

Rao Cavale, Mohan, "Role Based Access Control Using Windows Server 2003 Authorization Manager", Microsoft Corporation, Jan. 2003 [retrieved from http://msdn.microsoft.com/en-us/library/ms952386(printer).aspx]., 8 pages.

U.S. Appl. No. 11/847,686, filed Aug. 30, 2007, Office Action mailed Mar. 2, 2011, 11 pages.

U.S. Appl. No. 12/108,231, filed Apr. 23, 2008, Notice of Allowance mailed Jan. 21, 2011, 13 pages.

U.S. Appl. No. 12/108,231, filed Apr. 23, 2008, Office Action mailed Jul. 21, 2010, 16 pages.

* cited by examiner

Manage Delegation

Antonio Smith

Some of your self-service transactions can be delegated so that others may act on your behalf to initiate and/or approve transactions for you and/or your employees. In addition, others may have delegated responsibility for their transactions to you.

🛈 Learn More about Delegation

Select *Create Delegation Request* to choose transactions to delegate and proxies to act on your behalf.

Create Delegation Request ← 402

Select *Review My Proxies* to review the list of transactions that you have delegated and the proxy for each transaction.

Review My Proxies

Fig. 4

Create Delegation Request

Enter Dates

Antonio Smith

Administrator

Enter the dates for your delegation request. Enter a *From Date* that is today or later. Enter a *To Date* that is the same as or later than your *From Date*. For open-ended delegation requests, leave the *To Date* blank.

Delegation Dates

From Date: [02/21/2007] ← 502
To Date: [02/22/2007] ← 504

[ Next ]  [ Cancel ]

Fig. 5

Create Delegation Request

Delegation Detail

Antonio Smith

Administrator

Select the *Notify Delegator* checkbox to receive all the notifications that your proxy receives when acting on your behalf.

| | |
|---|---|
| Proxy: | Owen Wills |
| From Date: | 02/21/2007 |
| To Date: | 02/22/2007 |

⟩ 902

| Transactions |
|---|
| Manager Absence Approve |

☑ Notify Delegator

[ < Previous ]  [ Submit ]  [ Cancel ]

Create Delegation Request

Antonio Smith

Administrator

You have successfully submitted a delegation request. Refer to the My Proxies page to view the status of the request.

My Proxies

Antonio Smith

Administrator

This page allows you to view your proxies and the request status for each delegation request. Select a particular status and click *Refresh* to show the matching requests. Click the information icon to view request details. To revoke requests, select the request, then click *Revoke*.

Show Requests by Status: [ ▼ ] [ Refresh ]

1100

1102

| Transaction | Name | Job Title | From Date | To Date | Request Status | Delegation Status | |
|---|---|---|---|---|---|---|---|
| ☐ Manager Absence Approve | Owen Wills | Bus Person | 02/21/2007 | 02/22/2007 | Submitted | Inactive | ⓘ |

[ Select All ] [ Clear All ] [ Revoke ]

Return to Manage Delegation

From: renli.wang@oracle.com    Sent: Wed 2/21/2007 5:47 PM
To: renli.wang@oracle.com
Cc:
Subject: A delegation request from Antonio Smith has been submitted for review and acceptance Antonio Smith or an administrator on behalf of Antonio Smith has submitted a delegation request to you. Here are the details:
Transaction(s): Manager Absence Approve
From: 2007-02-21
To: 2007-02-22
System to notify Antonio Smith of each request: Y You can review the request, then accept or reject the request, using the link below.

http://det-rwang2/psp/ps/EMPLOYEE/HRMS/c/HCDL_ALL.HCDL_MGR_DLG_HOME.GBL?Page=HCDL_MGR_DLG_HOME&Action=U&DELEGATOR_ID=KOW001
&TRANSACTION_NAME=GP_SS_ABS_APPR_L&TRANS_ALLOWED=A&FROM_DATE=2007-02-21

My Delegated Authorities

Owen Wills

Bus Person

This page allows you to view your delegated authorities. Select a particular status and click *Refresh* to show the matching requests. Click the information icon for request details.

Show Requests by Status: [ Submitted ▼ ] [ Refresh ]

1300

1302

| Transaction | Name | Job Title | From Date | To Date | Request Status | Delegation Status | |
|---|---|---|---|---|---|---|---|
| ☑ Manager Absence Approve | Antonio Smith | Administrator | 02/21/2007 | 02/22/2007 | Submitted | Inactive | ⓘ |

[ Select All ] [ Clear All ] [ Accept ] [ Reject ]

1306

Return to Manage Delegation

Request Absence

Paul Harvest
Manager-Item Processing
Enter Start Date and Absence Name. Then complete the rest of the required fields before submitting or save for later your request.

Absence Detail

| | | |
|---|---|---|
| *Start Date: | 02/21/2007 | View Monthly Schedule |
| End Date: | 02/21/2007 | |
| Filter by Type: | All | |
| *Absence Name: | Jury | |
| *Reason: | Jury Duty | |
| Duration: | 1.00 Days | |

[ Calculate End Date or Duration ]

Comments

Requestor Comments: [                    ]

* Required Field

[ Save for Later ]  [ Submit ]

Go To:    View Absence Request History
          View Absence Balances

Request Details
Paul Harvest
Manager-Item Processing
View Request Status and Approval Details

Details

| | |
|---|---|
| Start Date: | 02/21/2007 |
| End Date: | 02/21/2007 |
| Absence Name: | Jury |
| Reason: | Jury Duty |
| Duration: | 1.00 Days |

Workflow

| | |
|---|---|
| Status: | Error. Contact Administrator. |

Request History

| Status | Name | Date | Comments |
|---|---|---|---|
| 1 Submitted | Paul Harvest | 02/21/2007 | |

1502

Absence Mgmt BySupervisorId

▽ Absence Management:Pending     ⊚ View/Hide Comments
Absence Mgmt BySupervisorId

| Pending | Skipped | Not Routed |
|---|---|---|
| Owen Wills for Antonio Smith<br>Absence By SupervisorId | No Approvers Found<br>Absence By SupervisorId | Multiple Approvers<br>Error Step |

▷ Comments

Go To:   Request Absence

Fig. 15

Review Transactions 1600

Owen Wills

This page allows you to view the status and relevant information for any transaction you either submitted for approval or have reviewed yourself. For each request you can get detailed information by clicking the hyperlink.

Transactions: [Pending my review ▼]   [Refresh]

Approval Transactions                                          Find   First ◁ 1-5 of 5 ▷ Last

| Transaction Name | Submitted By | Submitted For | Submitted On | Status | |
|---|---|---|---|---|---|
| Absence Mgmt BySupervisor | Paul Harvest | Paul Harvest | 2/21/2007 - 11:21 PM | Pending | Approve/Deny |

1602 →

| BGN_DT | EMPLID | EMPLRCD# | END_DT | PIN_TAKE_NUM | TRANSACTION_NBR |
|---|---|---|---|---|---|
| 2007-02-21 | KOW006 | 0 | 2007-02-21 | 2344 | 138 |

Fig. 16

Request Details
Paul Harvest                                                                      1700
Manager-Item Processing
Review the details for this request and either approve, deny or submit for rework. You may also enter optional comments about each approval choice.

Absence Detail

Start Date:     02/21/2007
End Date:       02/21/2007
Absence Name:   Jury
Reason:         Jury Duty
Duration:       1.00    Days

Workflow

Status:         Error. Contact Administrator.

Comments

Requestor Comments:

Approver Comments: [                                    ]

[Approve]   [Deny]   [Push Back]
  ↑          ↑
 1702       1704

Workflow Transactions 2200

▸ Workflow Transactions

In the grid below, insert a row for each transaction that will use the Approval Workflow Engine (AWE) and the Delegation Framework. Transactions can not be registered in both the Workflow Transactions and the AWE and Delegation Transactions grids.

▼ Approval Workflow Engine (AWE) and Delegation Transactions

Details1 | Details2

| *Transaction Name | *Approval Process ID | Delegate Initiation | Delegate Approvals | | |
|---|---|---|---|---|---|
| EP_APPRAISAL | PerformanceManagement | ☐ | ☑ | + | − |
| GP_ABSENCE | AbsenceManagement | ☑ | ☑ | + | − |
| HR_PROMOTION | PromoteEmployee | ☑ | ☑ | + | − |
| HR_REPORT_CHG | ReportingChgEmployee | ☑ | ☑ | + | − |
| HR_TRANSFER | TransferEmployee | ☑ | ☑ | + | − |
| JPMNonpersonProfiles | JPMNonpersonProfiles | ☐ | ☐ | + | − |
| JPMPersonProfiles | JPMPersonProfiles | ☐ | ☐ | + | − |

Fig. 22

Configure Delegation Transaction 2300

Transaction Name: Promotion
Transaction Type: Approve
**\*Description:** Approve Promotion Find | View All    First ◁ 1 of 1 ▷ Last

**\*Effective Date: 01/01/1900    \*Status:** Active    + −

Security
**\*Role:** Delegate_Promotion_Approve
**\*Component Name:** HR_PROMOTE_APPR

Fig. 23

FRAMEWORK FOR DELEGATING ROLES IN HUMAN RESOURCES ERP SYSTEMS

CROSS-REFERENCE TO RELATED APPLICATIONS

This application claims priority to and is a nonprovisional of U.S. Provisional Patent Application Ser. No. 60/970,217, filed Sep. 5, 2007, entitled "SYSTEMS AND METHODS FOR DELEGATING ROLES IN TRANSACTIONAL SYSTEMS," which is hereby incorporated herein in its entirety. This application also claims priority to U.S. Patent Application Ser. No. 60/970,448, filed Sep. 6, 2007, entitled "TRANSACTION REPORTING USING AN APPROVAL WORKFLOW ENGINE," which is hereby incorporated herein by reference.

This application is related to U.S. patent application Ser. No. 11/847,686, filed Aug. 30, 2007, entitled "ROUTING TRANSACTIONS IN A MULTIPLE JOB ENVIRONMENT USING AN APPROVAL FRAMEWORK," which is hereby incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

Embodiments presented herein generally relate to managing transactions, and more particularly, to delegating authority for managing transactions in an enterprise environment.

As organizations continue to move to paperless systems, the complexity of managing transactions electronically within an organization increases accordingly. In many instances, existing transaction management and workflows are not sufficient to provide the functionality needed to process transactions in all situations. For example, an employee might submit a transaction that requires approval from at least one manager, supervisor, or other person. If that manager is unavailable, it is necessary to assign someone to approve or otherwise handle the transaction. Further, there are other transactions that need to be initiated when a manger is unavailable, such that a person needs to be assigned that responsibility.

Existing systems have several deficiencies in such situations. For example, many systems do not provide a way to assign approval responsibility to another person. Generally, an administrator or other user cannot delegate responsibility on behalf of a manager or supervisor to another person in workflow systems. If a system includes some ability to assign responsibility, the system, in many cases, allows a user having specific security access or certain roles within the organization to be allocated the responsibility. Generally, systems do not provide the ability to provide a user with security access at the level of the data or at the level of the pages that are accessed to manage the transactions. Prior attempts also do not provide sufficient integration with workflows or worklist items and do not automatically re-assign worklist items.

It is in light of these and other considerations that the present application is being presented.

SUMMARY

Due to the problems above, it is desirable to provide a workflow management approach that provides for flexible delegation of transaction management to any appropriate employee or user. Further, it is desirable to allow users to inherit the security access needed to perform the delegated functionality. It is further desirable to provide a way to manage, track, and otherwise handle such delegation.

The embodiments presented here provide systems and methods for delegating responsibility for one more tasks to one or more users. In embodiments, a manager accesses the delegations system. The manager can select one or more people to assume authority for one or more tasks, in a workflow. The selected people can be given an opportunity to accept the authority. If accepted, the selected person, in embodiments, is passed the authority for the tasks and is given the requisite security access to accomplish the selected tasks. The delegation of authority may be temporary or permanent. The delegator can also terminate the delegation.

This summary is meant only to provide a brief description of one or more embodiments. In no way is this summary meant to limit the scope of the embodiments. The disclosure is as presented in the claims.

BRIEF DESCRIPTION OF THE DRAWINGS

Various embodiments in accordance with the present disclosure will be described with reference to the drawings, in which:

FIG. 4 is an embodiment of a user interface display for delegating authority;

FIG. 5 is another embodiment of a user interface display for delegating authority;

FIG. 9 is another embodiment of a user interface display for delegating authority;

FIG. 10 is another embodiment of a user interface display for delegating authority;

FIG. 11 is another embodiment of a user interface display for delegating authority;

FIG. 12 is another embodiment of a user interface display for delegating authority;

FIG. 13 is another embodiment of a user interface display for delegating authority;

FIG. 14 is another embodiment of a user interface display for delegating authority;

FIG. 15 is another embodiment of a user interface display for delegating authority;

FIG. 16 is another embodiment of a user interface display for delegating authority;

FIG. 17 is another embodiment of a user interface display for delegating authority;

FIG. 20 is another embodiment of a user interface display for delegating authority;

FIG. 21 is another embodiment of a user interface display for delegating authority;

FIG. 22 is another embodiment of a user interface display for delegating authority;

FIG. 23 is another embodiment of a user interface display for delegating authority;

DETAILED DESCRIPTION

Systems and methods in accordance with various embodiments can overcome the aforementioned and other deficiencies in existing transaction management systems by providing for the delegation of transaction management to any appropriate employee. The delegation allows a manager to select any person to act as a proxy on the manager's behalf, and provides any additional security access necessary for the proxy to perform the delegated tasks. Such a system also tracks all delegations and activity, so that an accurate trail can be reported for any given transaction. Such systems and methods also provide other functionality, such as administration functions for setting up delegations and managing the activation and deactivation of delegations, as well as allowing an administrator to set up a delegation where necessary. These approaches can be used with a business process such as an approval process, wherein transactions are routed for approval within an organization, or an initiation process, wherein a transaction requiring action is initiated. Such approaches also can provide a status monitor that is able to determine and display the current approval state for each such transaction outside of transaction processing.

Figure 1:
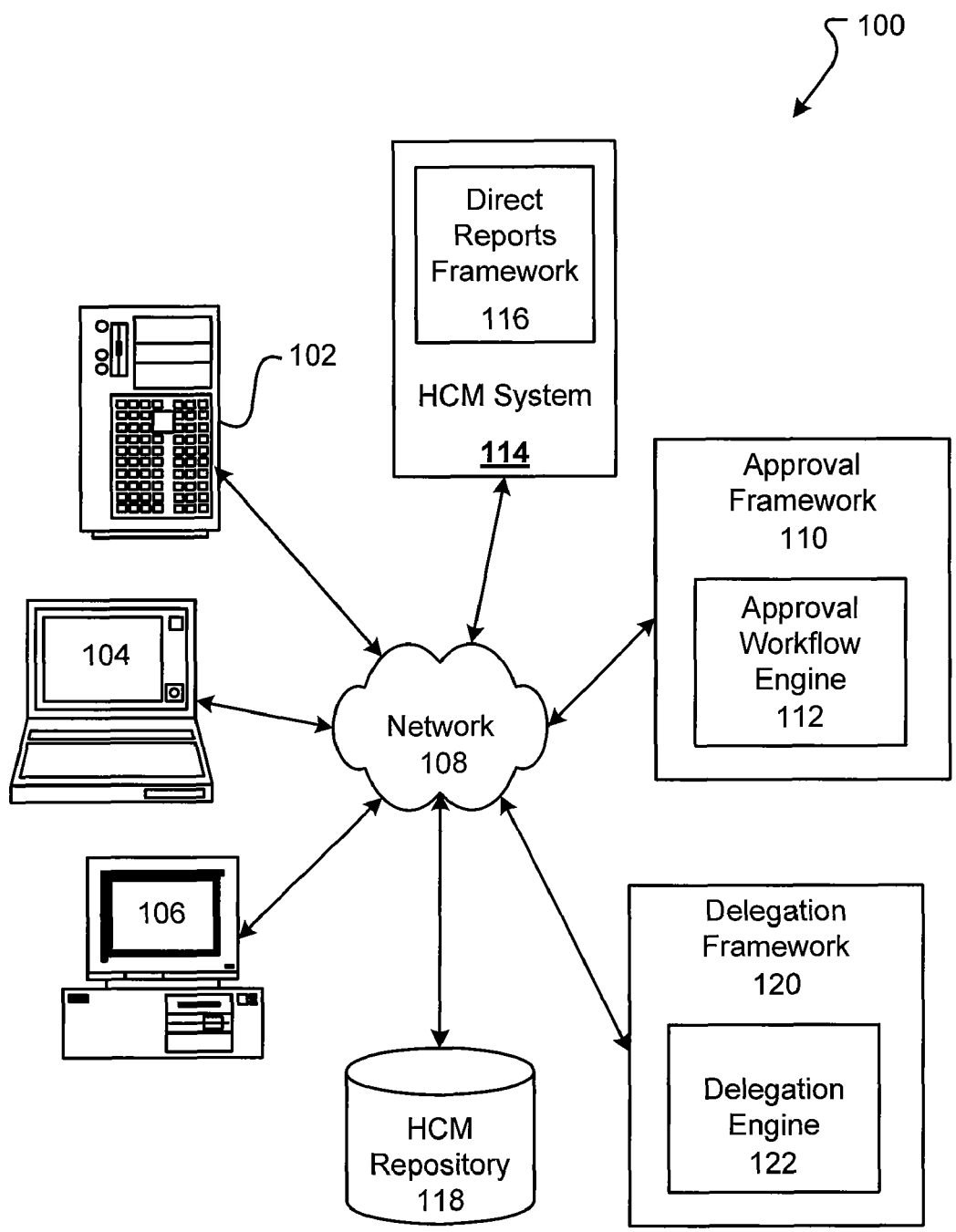
FIG. 1 is a block diagram of an embodiment of a system for generating reports.

An embodiment of a system 100 for generating reports is shown in FIG. 1. An example of the system 100 is the PeopleSoft Enterprise Human Capital Management (HCM) available from Oracle Corporation of Redwood Shores, Calif., which is an application for performing human resources-related functions such as tracking employee and job information. In embodiments, an employee transaction can be submitted by the employee through, for example, a laptop 104 or desktop computer 106, or submitted via a server 102 from a transaction application, where the transaction passes through an appropriate network 108 and is received by the HCM system 114. The network, in embodiments, is a local area network (LAN), a wide area network (WAN), the Internet, or other network.

An HCM system 114 is hardware, software, or hardware and software for processing transactions. An HCM system 114 stores information in an HCM repository 118. The HCM repository 118, in embodiments, is a database or other storage system that may be stored on a computer-readable medium. The HCM system 114 can also include a Direct Reports framework 116. In embodiments, the Direct Reports framework 116 includes functionality for determining organizational relationships. In one example, a Direct Reports framework 116 allows customers or organizations to define employee/manager relationships from HCM system 114 to access types such as Supervisor, Department, Position, Partial-Position-Supervisor, and Partial-Position-Department. The HCM system 114, in embodiments, includes a Direct Reports interface (not shown). The Direct Reports interface can be a common API capable of encapsulating common logic for determining direct reports, which is able to determine direct reports for a given employee or to determine the person or entity to which an employee or job directly reports.

In embodiments, the exemplary HCM system 114 also interfaces with an Approval Framework 110. The Approval Framework 110, in embodiments, is a common framework that is independent of the HCM system 114. The Approval Framework 110 is hardware, software, or hardware and software for supporting the approval of transaction and for hosting many applications including and in addition to the HCM system 114. The Approval Framework 110 can be used to define and route transactions that require approvals. The Approval Framework 110 can interface with an engine 112 (which may be referred to as an approval workflow engine (AWE)) that provides the capability and framework for creating, running, and managing approval processes. In embodiments, the engine 112 is a component of the Approval Framework 110. In alternative embodiments, the engine 112 is a separate component.

In one embodiment, the Direct Reports framework 116 accesses information by an identifier, such as supervisor ID. Within the database, organizations can define relationships by explicitly defining a supervisor for an employee, by creating departments and placing employees in those departments with a manager being assigned to each department, or any other appropriate approach. Relationships also can be defined by employee position, where a developer position and a development manager position are assigned, and those two positions report to one another.

The engine 112 can use a series of database objects combined with application component configuration settings to determine how to process approvals using workflows. Approval workflows are triggered when requesters submit a transaction. The application passes the transaction over to the engine 112, which finds the appropriate approval process definition and launches the approval workflow. A set of approvers then carry out tasks related to the transaction.

The engine 112 allows multiple levels of users to develop, configure, and use transaction approvals that meet organizational requirements. In order to provide such functionality to an application, the application implements or integrates the Approval Framework 110 in order to leverage the functionality. A "power user" or implementer registers the application with the engine 112. The registration requests the implementer to define or describe the application components, event handler, and records, for example. The implementer can also create a record and table in which to store cross-reference information and set-up notification templates for events. In embodiments, an Approval Process Definition is defined by an implementer to include items such as stages, paths, steps, varying hierarchies, and criteria, among other configurable parameters, which determine how the engine 112 will manage the approval. The registration allows the Approval Framework 110 to understand how to respond to an approval request from the application. Thereinafter, the application, in embodiments, makes calls into the Approval Framework 110.

When a user submits a transaction for approval, the submission action launches the approval process. In embodiments, the engine 112 reads an approval process definition and queues the transaction for approval. Each Approval Process Definition includes a process identifier (ID) that is registered with the engine 112. The engine 112 allows a user to escalate an approval when not getting feedback, and reassign approval tasks to another user or a proxy. The engine 112 can generate a worklist and email notifications for any processed or requested approval so that there is a well-documented path including information for each step of the approval process. The documentation path information can be used to provide a detailed description of approval transactions that have passed through the engine 112. The document path information, in embodiments, includes every step within the approval process, date/time stamps, originator, approver, proxy, proxies, and transaction details, and any other field that the engine 112 is tracking for a transaction. Such a customizable tool can help with auditing and Sarbanes-Oxley compliance, for example.

Embodiments of the system 100 also includes a delegation framework 120. In embodiments, the delegation framework 120 includes a delegation engine 122 and a delegation interface or API (not shown). The delegation framework 120 is hardware, software, or hardware and software operable to complete the actions described herein. The delegation framework 120 can be used with the HCM system 114, along with or separate from the Approval Framework 110, to provide for the delegation of transaction management for the HCM system 114. Delegation may refer to the act of giving another user the authority to initiate and/or approve one or more specific transactions on behalf of a user. The delegation can be for a defined period of time. An HCM enterprise application can include many transactions, which can include logic for business processes for tasks such as allowing an employee to request an absence or allowing a manager to approve someone for hiring, promotion, or termination. In embodiments, two types of transactions exist. A first type of transaction will be referred to as an initiate transaction, which allows a manager or employee to trigger or "initiate" a business process. A second type of transaction will be referred to as an approval transaction, which allows a user, such as a manager, supervisor, or proxy, to approve business requests. The behavior of a delegation can be different and customized for the type of transaction.

In embodiments, the delegator delegates authority for one or more transactions to another user, referred to as a proxy. A delegator is a manager who delegates authority for at least one transaction to a proxy. In embodiments, a proxy is a person requested by the manager to receive the delegated right(s). For example, a delegator can delegate rights to the proxy when the delegator is on vacation. The delegation framework 120 can also have a delegation administrator. The delegation administrator may be responsible for tasks such as setting up the delegation system, resolving any delegation issues or errors through an administration console, configuring a maintenance batch, and ensuring that the delegated authority begins and ends at the appropriate times.

A delegator can have several proxies because a manager may be responsible for several transactions. A manager can delegate authority for one transaction to a first person and authority for a second transaction to a second person. A delegator can also establish a separate start and end date for each delegation. In embodiments, the delegator can delegate Approval, Initiate, and any other appropriate transactions. A delegator can also have the ability to revoke any of the delegated authorities. For example, if the delegator is no longer going to be unavailable, the delegator reviews any proxies that are already defined and revokes one or more of the delegations.

In embodiments, the delegation engine 122 allows a user to accept or reject delegation requests. The proxy can initiate or approve any transactions that have been delegated to that user.

Once a user accepts responsibility as a proxy, the user, in embodiments, becomes the active proxy at the specified time and receives the necessary security access. The proxy can receive all of the manager's approval requests under the selected transaction group (discussed later herein). When the delegation begins, the user can initiate transactions, for example, transfers and pay rate changes. In alternative embodiments, a proxy may not be allowed to perform all delegated tasks.

The delegation engine 122 also can allow a delegation administrator to configure the delegation installation settings and other configurable parameters. A delegation administrator may also set up delegation transactions, create delegation requests, revoke delegated authority, and run system maintenance processes. Maintenance processes can include the running of a batch process to determine any delegations that have expired, where delegated authority needs to be revoked. In some embodiments, the revocations may be done automatically, but, in other embodiments, a delegation administrator may run such a batch process daily to revoke delegations. In embodiments, the delegation process through the delegation engine 122 is a self-service operation. Managers can create delegation requests allowing a proxy to act on behalf of the manager. In some embodiments, an administrator can intervene in the delegation process, if necessary.

Figure 2:
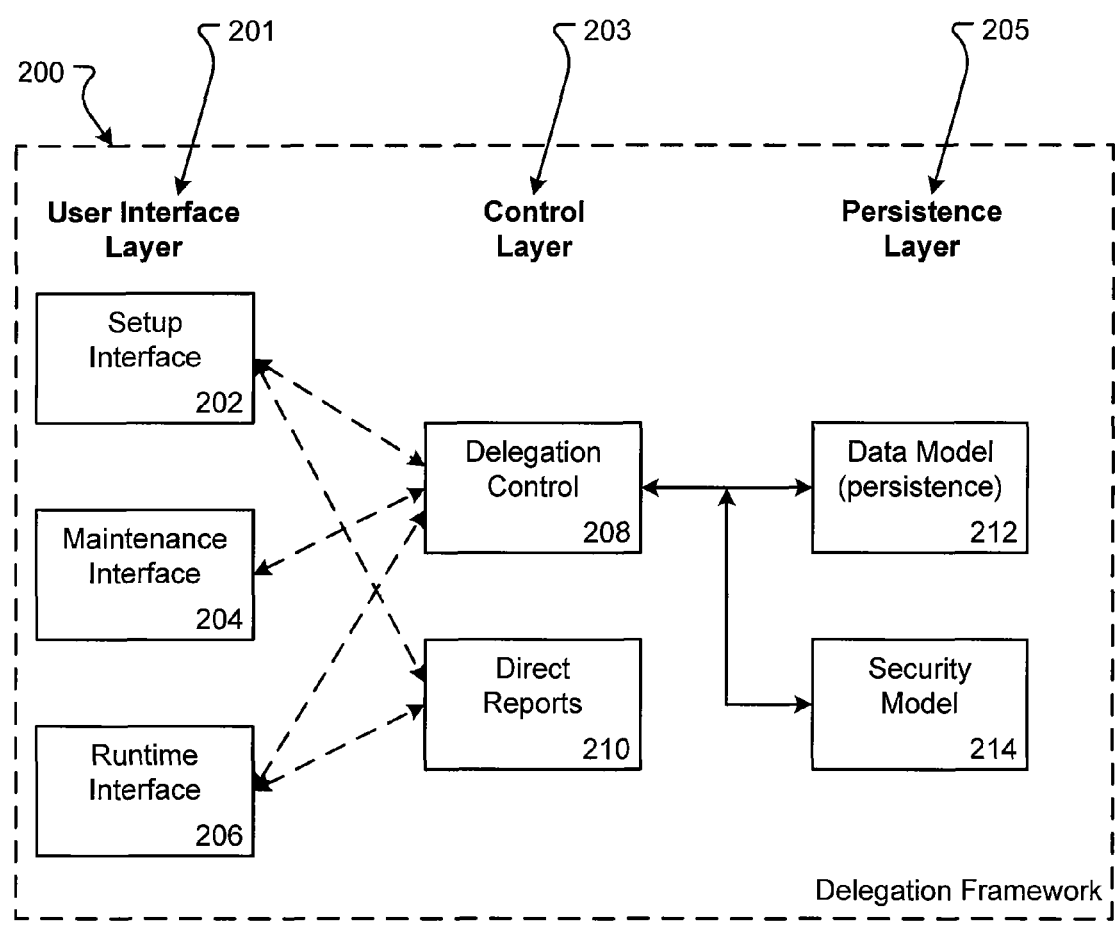
FIG. 2 is a block diagram of an embodiment of a delegation framework.

An embodiment of a delegation framework 200 is shown in FIG. 2. The delegation framework 200 can be the same or similar to delegation framework 120 (FIG. 1). The delegation framework 200, in embodiments, comprises software components or modules stored as instructions on a computer-readable medium. When the instructions are executed by a processor of a computer system, the instructions cause the processor to complete the function described herein. In embodiments, the delegation framework 200 comprises three layers: a user interface (UI) layer 201, a control layer 203, and a persistence layer 205.

The UI layer 201 can include a delegation setup interface 202. The delegation setup interface 202 can allow a user to setup the delegation framework 200. Setting up the delegation framework 200 with the delegation setup interface 202 can include creating system pages (i.e., the displays provided to the user to accomplish tasks), managing parameters associated with the delegation framework 200 (creating, deleting, and/or modifying different attributes of the delegation framework 200), and/or creating or customizing user displays or user features. In embodiments, the delegation setup interface 202 manages the creation and management of administrative setup pages, delegate pages, and/or revoke delegation authority pages.

In embodiments, the UI layer 201 can also include a delegation maintenance interface 204. The delegation maintenance interface 204 can manage records for one or more delegated transactions. An administrator may use the delegation maintenance interface 204 to control user rights to one or more types of delegation, user access to one or more delegation pages, and/or user authority to create, modify, or delete one or more delegations. In embodiments, the delegation maintenance interface 204 is also used to delete stale delegations or complete clean-up of delegation existing in the system. An administrator may also manage security issues with the delegation maintenance interface 204.

The UI layer 201, in embodiments, also includes a runtime interface component 206. The runtime interface component 206 can handle user interactions required at runtime. For example, the runtime interface component 206 manages when a proxy acts on a transaction. The runtime interface component 206, in embodiments, manages interfaces for the delegator and the proxy. In embodiments, the runtime interface component 206 can customize the runtime interfaces for different users or for different tasks.

The setup, maintenance, and runtime interfaces 202, 204, and 206 can call into a direct reports application 210 of the control layer 203. The direct reports application 210 can manage one or more approval functions, for example, human resource approvals for hiring or pay raises. The direct reports application 210 is only an example of an application into which the setup, maintenance, and runtime interfaces 202, 204, and 206 can call; another application or system maintaining employee supervisory relationships can called by the setup, maintenance, and runtime interfaces 202, 204, and 206. Further, a direct reports application 210 can be separate from the delegation framework 200.

In embodiments, the control layer 203 also includes a delegation control application 208. The delegation control application 208 manages the delegation of authority using one or more interfaces provided by the setup, maintenance, and runtime interfaces 202, 204, and 206. The setup, maintenance, and runtime interfaces 202, 204, and 206 can call into a delegation control application 208, and can pass events into the delegation control application 208. The delegation control application 208 can create delegation records, change and/or manage delegation attributes for one or more proxies or delegators. In embodiments, the delegation control application 208 can execute one or more runtime components of the delegation framework 200 to effect delegation. In one embodiment, the delegation control application 208 orchestrates the delegation framework 200 and depends on the direct reports UI for displaying all of the reporting hierarchies.

The delegation control application 208 can provide the hierarchies ("direct report hierarchies") necessary to determine an appropriate person to approve or manage a transaction. For example, the delegation control application 208 determines from the identity of the currently logged-in user to whom the user reports. The delegation control application 208 can then provide the delegation information to the HCM system. After determining the appropriate manager to approve a transaction, the delegation control application 208 can determine whether that manager has an active proxy to manage that transaction. If the manager does have an active proxy, the delegation control application 208 can obtain the proxy information from the delegation tables and return the proxy information to the HCM system.

The delegation control 208 also works with one or more components of a persistence layer 205. The persistence layer 205 can include a data model 212 and a security model 214. In embodiments, the data model 212 provides input/output (I/O) access to the database records used by the delegation framework 200 to store and/or retrieve data. The database tables, in embodiments, are represented as objects. Thus, the objects can provide abstraction from the physical definition of the database records. The abstraction provides advantages, for example, ease of maintenance, modularity, and upgradeability.

The persistence layer 205 can also include a security model 214. The security model 214, in embodiments, provides navigational security and database security. For example, the security model 214 can determine access rights to the data model 212 to change, create, or delete records used by the delegation framework 200. The security model 214 can be a controller. Thus, the security model 214 can enable the delegation control component 208 to authenticate or authorize the current user.

One or more embodiments of user interfaces for completing actions with the delegation framework 200 are shown in FIGS. 4-23. The user interfaces may be pages, as described in conjunction with FIG. 2, for administering the delegation framework 200, creating delegations, modifying delegations, and/or deleting delegations. The one or more user interfaces can have one or more user interface devices, for example, selectable icons, buttons, toolbars, etc. The user interface devices allow a user to input information into the delegation framework 200 and/or signal the delegation framework 200 to complete one or more actions. The examples of the user interfaces in FIGS. 4-23 are merely for explanation purposes, and the described and related functionality can be presented in different user interfaces in many different ways, combinations, and/or sequences. The user interfaces will now be references to describe one or more methods described in conjunction with FIGS. 3A-3C.

Figure 3A:
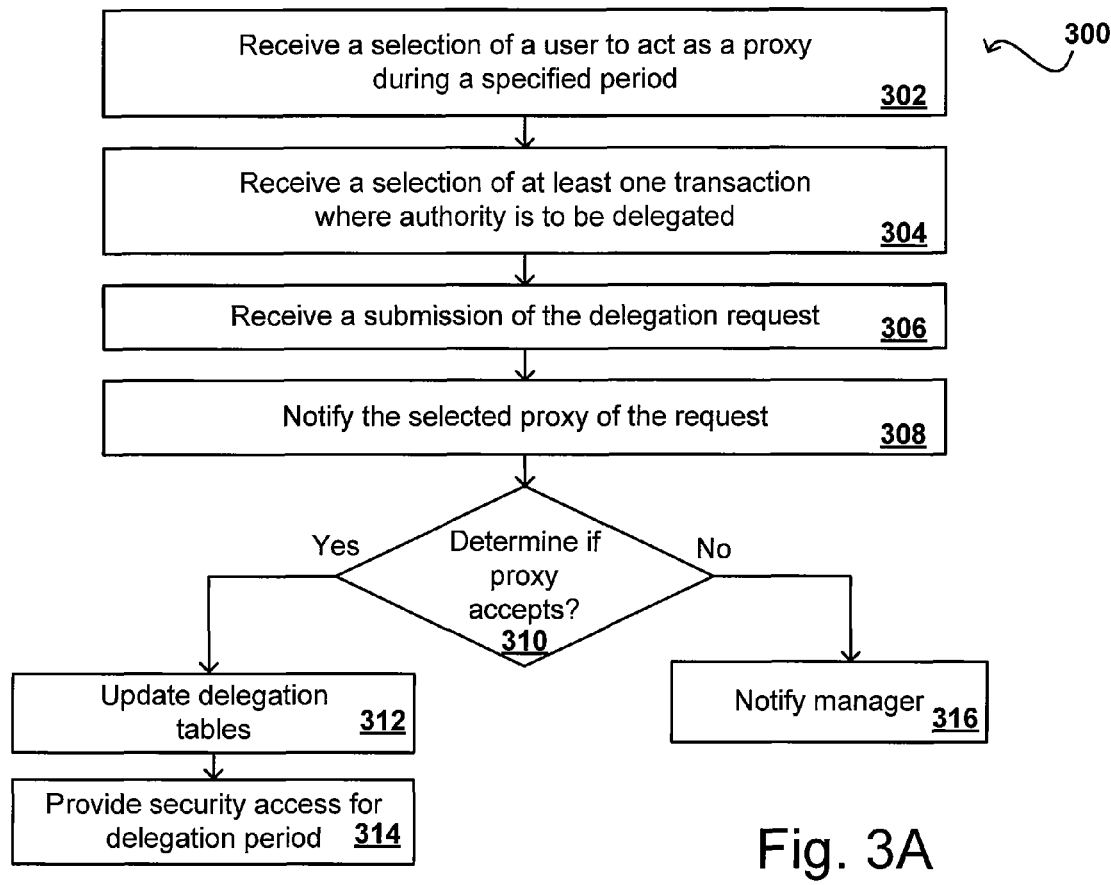
FIG. 3(A) is flow diagram of an embodiment of a method for delegating a proxy.

An embodiment of a method 300 for creating a delegation is shown in FIG. 3A. The method 300 can be performed as a set of instructions executed by a processor of a computer system. Receive operation 302 receives a selection of a user to act as a proxy. In embodiments, a manager interacts with a delegation framework 120 (FIG. 1) through one or more pages. The setup, maintenance, and runtime interfaces 202, 204, and 206 (FIG. 2) can present the pages to a delegation control application 208 (FIG. 2) to receive the selections for the delegation. In embodiments, the delegation engine 122 (FIG. 1) receives the selections. As shown in FIG. 4, a delegation management screen 400 allows a user to perform tasks, for example, creating a delegation request and reviewing proxies. The delegation management screen 400 can be the default delegation management screen 400 presented to a user who logs in as a manager. If the user selects an option 402 to create a delegation request, the user can be presented with a screen 500 as shown in FIG. 5. In embodiments, the user is able to select a start date 502 and end date 504 for a period for the delegation.

Figures 6, 7, 8:
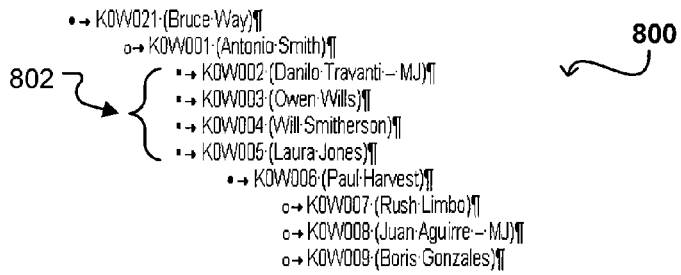
FIG. 6 is another embodiment of a user interface display for delegating authority.
FIG. 7 is another embodiment of a user interface display for delegating authority.
FIG. 8 is another embodiment of a user interface display for delegating authority.
Figure 18:
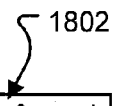
FIG. 18 is another embodiment of a user interface display for delegating authority.

The manager may also select a proxy in user interface 700 shown in FIG. 7. The manager can select a name of a person using one or more user interface devices 704. The screen 700 displays users to which the manager can delegate authority. These users can be default users presented to the manager based on the manager's reporting hierarchy. The reporting hierarchy may be stored in a database and accessed by the data model 212. An example of a hierarchy 800 is shown in FIG. 8. In the example, the manager Antonio Smith reports to one person (Bruce Way) and has a number of people that report to him, either directly or indirectly. The group of people 802 most closely associated with Antonio Smith are the group of people from which Antonio Smith can delegate authority and populate the default proxy listing 704 in FIG. 7. If the manager wishes to select another employee, the manager can select an option 702 that allows the manager to select another user. The option 702 can allow the user to select an employee by searching the HCM system 114 (FIG. 1), entering an employee ID or other information.

Receive operation 304 receives a selection of at least one transaction where authority is delegated. In embodiments, a manager interacts with a delegation framework 120 (FIG. 1) through one or more pages to select the transaction. The setup, maintenance, and runtime interfaces 202, 204, and 206 (FIG. 2) can present the pages to a delegation control application 208 (FIG. 2) to receive the selections for the transaction. In embodiments, the delegation engine 122 (FIG. 1) receives the selections. The user also can be presented with a screen 600 such as illustrated in FIG. 6. The user can select one or more user interface devices 602 to select the transaction(s) to be included with the request. As is shown in FIG. 6, the selections 602 can include transactions for approving promotions and initiating promotions. An administrator can have the option of determining which transactions can be delegated in such a request. In embodiments, an organization may not wish to allow critical tasks, for example, promoting and terminating employees, to be handled by some users. As such, the administrator may prohibit a manager from delegating those critical tasks.

Receive operation 306 receives the submission of the delegation request. In embodiments, a manager interacts with a delegation framework 120 (FIG. 1) through one or more pages to submit the delegation request. The setup, maintenance, and runtime interfaces 202, 204, and 206 (FIG. 2) can present the pages to a delegation control application 208 (FIG. 2) to receive the selections for the delegation. In embodiments, the delegation engine 122 (FIG. 1) receives the selections. Once the manager has selected a user, dates, and/or a transaction to be delegated, the manager can be presented with a delegation request submission page 900 as shown in FIG. 9. The delegation request submission page 900 allows the manager to review the details 902 of the delegation request. By selecting a user interface device 904, the manager can submit the request when satisfied. The manager can then be presented with a confirmation page 1000 as shown in FIG. 10. In embodiments, to complete the submission of the delegation request, the manager selects a user interface device 1002. The submitted delegation 1102 can be shown in a user interface 1100, shown in FIG. 11. The submitted delegation 1102 may then be visible in the list of proxies for that manager. The manager can repeat this delegation request process to delegate other transactions to other people, and the other delegations can be shown in the user interface 1100.

Notify operation 308 notifies the selected proxy of the request. In embodiments, the delegation framework 120 (FIG. 1) notifies the proxy. The setup, maintenance, and runtime interfaces 202, 204, and 206 (FIG. 2) can present the pages to a delegation control application 208 (FIG. 2) to notify the proxy of the delegation. In embodiments, after the delegation request is submitted, an email message 1200, as shown in FIG. 12, can be sent to the user requested to act as the proxy. In alternative embodiments, the user can be notified in other ways, for example, by text message or instant message. The delegation request, in still other embodiments, can be displayed in a list of tasks for the user or in another display as configured by the delegation administrator. The message 1200 can include a selectable link 1202 (the selectable link may be a uniform resource locator "URL" or other pointer) that takes the user to a page 1300 (shown in FIG. 13) that includes information for the delegation request.

Determine operation 310 determines if the proxy accepts the delegation request. In embodiments, the proxy interacts with the delegation framework 120 (FIG. 1) to accept or deny the delegation request. The setup, maintenance, and runtime interfaces 202, 204, and 206 (FIG. 2) can present the pages to a delegation control application 208 (FIG. 2) to allow the proxy to accept or deny the delegation. In embodiments, the user selected as the proxy chooses the selectable line 1202 to logon to the delegation control application 208 (FIG. 2), through the security module 214 (FIG. 2), to access a page 1300 shown in FIG. 13. The page 1300 can display the information 1302 associated with the delegation request. In embodiments of page 1300, the user can select a user interface device 1304 to accept the delegation or another user interface device 1306 to reject the delegation. In embodiments, if the user accepts the delegation by selecting the user interface device 1304, the method flows Yes to update operation 312. If the user rejects or denies the delegation by selecting user interface device 1306, the method flows No to notify operation 316.

Update operation 312 updates the delegation tables including the active delegations. The delegation table can include information about the manager and/or proxy, the dates for the period of delegation, the authority given, etc. In embodiments, the delegation framework 120 (FIG. 1) updates data in the delegation tables. The delegation control application 208 (FIG. 2) can update the data tables using the data model 212 (FIG. 2). The updated delegation tables can then be accessed to show the active delegation for the manager, the proxy, and/or the administrator.

Provide operation 314 provides security access for the proxy during the delegation period. In embodiments, the delegation framework 120 (FIG. 1) updates the security access for the proxy during the delegation period. In embodiments, the security model 214 (FIG. 2) interacts with the delegation control application 208 (FIG. 2) to change security settings for the proxy by updating the data tables using the data model 212 (FIG. 2). The updated delegation tables can show the new security access for the proxy during the delegation period. The delegation framework 120 (FIG. 1) also provides any necessary security access to the proxy when the delegated authority is active.

If the user denies the delegation request, notify operation 316 notifies the manager of the rejection. In embodiments, delegation framework 120 (FIG. 1) sends a notice to the manager. In embodiments, a manager interacts with a delegation framework 120 (FIG. 1) to acknowledge the rejection. The setup, maintenance, and runtime interfaces 202, 204, and 206 (FIG. 2) can present the pages to a delegation control application 208 (FIG. 2) to notify the manager of the rejection. In embodiments, the manager receives an email, instant message, text message, user interface display (for example, a pop-up window), or some other alert.

Figure 3B:
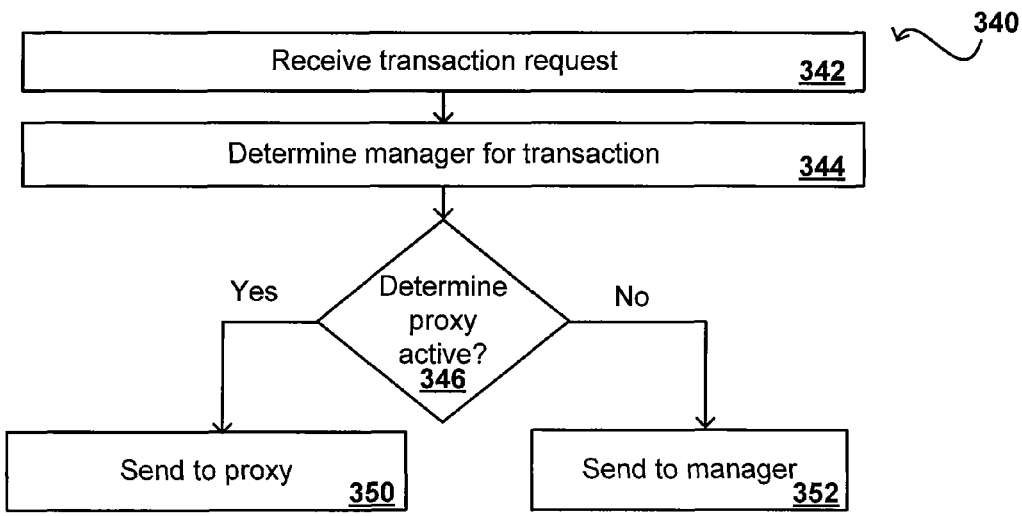
FIG. 3(B) is flow diagram of an embodiment of a method for submitting a transaction in the case of an active proxy.

An embodiment of a method 340 for receiving and processing a transaction when an active proxy exists is shown in FIG. 3B. The method 340 can be performed as a set of instructions executed by a processor of a computer system. Receive operation 342 receives a transaction request. In embodiments, an approval framework 110 (FIG. 1) receives a selection to start a transaction process through the approval workflow engine 112 (FIG. 1). A page 1400, shown in FIG. 14, can be displayed to an employee wishing to submit a transaction. In the example shown in FIG. 14, the request is for an absence to attend jury duty. Here, the employee is able to include dates and information for the request, then submit the request for approval. In response to the selection for a transaction, the approval framework 110 (FIG. 1) can request information about the transaction or one or more managers from the HCM system 114 (FIG. 1). In embodiments, the direct reports framework 116 (FIG. 1) receives the request. The request can be a call to a direct reports application 210 (FIG. 2).

Determine operation 344 determines the manager for the transaction. In embodiments, the call into the direct reports application 210 (FIG. 2) causes the direct reports application 210 (FIG. 2) to access one or more data tables in the HCM repository 118 (FIG. 1) to determine the manager responsible for the transaction. After determining the manager, the direct reports application 210 (FIG. 2) can call the delegation control application 208 (FIG. 2) to determine if an active proxy exists.

Determine operation 346 determines if a proxy is active. In embodiments, the delegation control application 208 (FIG. 2) receives a call to determine if a proxy is active. The delegation control application 208 (FIG. 2) activates the authority for the proxy when the active date for the proxy is reached. The delegation control application 208 (FIG. 2) can access the data model 212 (FIG. 2) to view one or more delegation tables. The delegation tables can store information associated with the manager responsible for the transaction and associated with the transaction. After determining the manager and or proxy, the requesting employee can view a detail summary page 1500, as shown in FIG. 15, providing information about the transaction request. The employee can access a status monitor 1502 illustrating the approval state for the transaction. As shown in FIG. 15, the status monitor 1502 reflects that Owen Wills has received the transaction, and that he is acting as a proxy for Antonio Smith. If a proxy is active, the method flows Yes to send operation 350. If no proxy is active, the method flows No to send operation 352.

Send operation 350 sends the transaction request to the proxy. In embodiments, the delegation control application 208 (FIG. 2) answers the call from the direct reports application 210 (FIG. 2) that a proxy is active. The delegation control application 208 (FIG. 2) can provide information about the proxy. The direct reports application 210 (FIG. 2) can then send the transaction request to the proxy. For example, a proxy can view a review transaction page 1600, shown in FIG. 16, to view the pending transactions 1602. The proxy can select a pending transaction 1602 to view an approval page 1700 shown in FIG. 17. The approval page 1700 allows the proxy to approve or deny the transaction by selecting either an approve user interface device 1702 or a deny user interface device 1704. After either approval or denial, the requesting employee or the manager may access the transaction detail page 1800 shown in FIG. 18. The transaction detail page 1800 can now show the updated status for the approval process in the approval detail section 1802. For example, the approval detail section now shows that Owen Wills, acting as proxy for Antonio Smith, approved the transaction. In embodiments, the manager can overlook one or more approvals or denials received from the proxy and reverse the decision.

Send operation 352 sends the transaction to the manager rather than a proxy. The process for having the transaction approved by the manager is similar to that of the proxy approving the transaction. The same systems and/or pages may be used and will not be explained further.

Figure 3C:
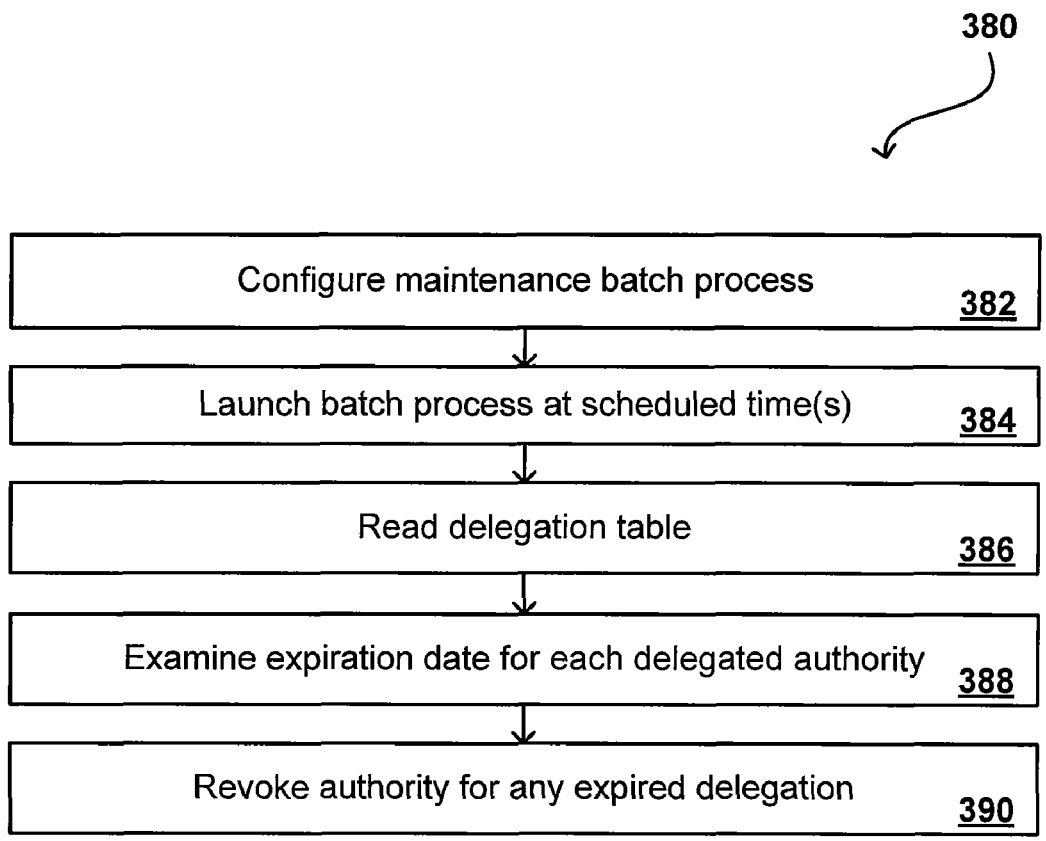
FIG. 3(C) is flow diagram of an embodiment of a method for removing delegated authority.
Figures 20, 21:
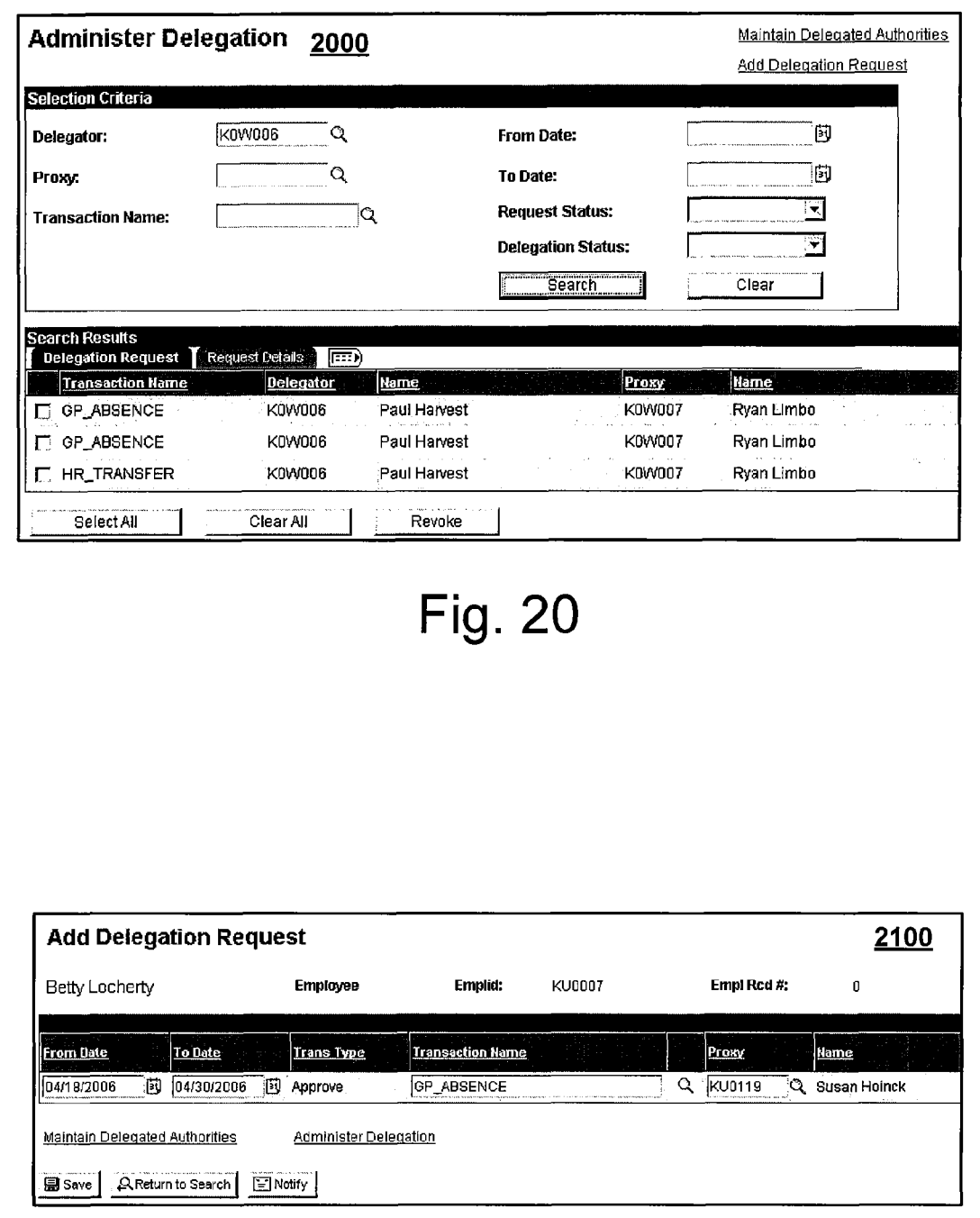

An embodiment of a method 380 for removing delegated authority is shown in FIG. 3C. The method 380 can be performed as a set of instructions executed by a processor of a computer system. Configure operation 382 configures a maintenance batch process. In embodiments, an administrator accesses an administration console in communication with the delegation framework 120 (FIG. 1). The administrator can create a process that reoccurs periodically at a predetermined time interval. For example, the batch process can run daily at 11:00 p.m. The batch process can be established with the delegation control application 208 (FIG. 2) by interfacing with setup, maintenance, and/or runtime interfaces 202, 204, and 206 (FIG. 2). For example, a delegation control application 208 (FIG. 2) can provide an administration page 2000 as shown in FIG. 20 to search through delegations and review the status of the delegations. Other pages may be provided to create the batch process.

Launch operation 384 launches the batch process. In embodiments, at the predetermined time, the delegation control application 208 (FIG. 2) can launch the batch process to delete one or more expired delegations. The delegation control application 208 (FIG. 2) can access one or more items of data using the data model 212 (FIG. 2). Read operation 386 reads the delegation table. The delegation control application 208 (FIG. 2) calls the data model 212 (FIG. 2) to read the delegation table. The data model 212 (FIG. 2) searches each record recording a delegation. In embodiments, the records are objects, and the data model 212 (FIG. 2) searches for a value of an attribute of the object representing the delegation.

Examine operation 388 examines the expiration date for one or more delegation. In embodiments, the data model 212 (FIG. 2) reads the expiration date field or attribute of the delegation. The data model 212 (FIG. 2) can compare and determine if the current date is later than the expiration date. If the current date is later than the expiration date, the delegation has expired. The data model 212 (FIG. 2) returns one or more pointers, identifiers, or records, in response to the request by the delegation control application 208 (FIG. 2).

Figure 19:
FIG. 19 is another embodiment of a user interface display for delegating authority.

Revoke operation 390 revokes the authority for the one or more returned delegations. In embodiments, the returned delegations from the data model 212 (FIG. 2) are expired. The delegation control application 208 (FIG. 2) can revoke the authority of the returned delegations. In embodiments, the delegation control application 208 (FIG. 2) sends an instruction to the data model 212 (FIG. 2) to delete the expired delegations. In an alternative embodiment, the delegation control application 208 (FIG. 2) instructs the data model 212 (FIG. 2) to modify the record to show that the delegation has expired. Showing the delegation as expired may occur for a predetermined time and then the record may be deleted. A delegation administrator can also perform the revocation task manually. For example, the administrator can view the list of delegated authorities in a page and manually select any delegations to be revoked. In embodiments, the delegator (e.g., the manager) can also revoke a delegation. The manager can view all of the delegations for that delegator and revoke any delegated authority by selecting the delegation for revocation. The revocation by the administrator or delegator can be done at any time, not just when the authority has expired. Once the delegated authority for a proxy expires or is revoked, the proxy can see expiration or revocation in the proxy status 1902 of the proxy status page 1900 as shown in FIG. 19.

The batch process can also be configured to perform additional tasks. For example, a batch process run daily can activate any future-dated delegation requests that have been accepted by the respective proxy. The batch process can also revoke any delegation requests that have not been accepted. The batch process can also check the proxies to ensure that each proxy is still an active employee in the system. Other tasks that can be batched are also possible.

Other tasks are also possible with the delegation framework 120 (FIG. 1). The delegation framework 120 (FIG. 1) can provide other user interfaces to accomplish other tasks. The administrator can be provided with a page 2100 that allows the administrator to add delegation requests as shown in FIG. 21. The administrator also can be provided with a page 2200 that allows the administrator to select whether a manager can delegate, initiate and/or approve delegation of authority for specific transactions, as shown in FIG. 22. The administrator can be presented with a page 2300 that allows the user to select a security role to be applied to a proxy and allows the user to select when the proxy obtains active delegation authority for a specific transaction as shown in FIG. 23.

Figure 24:
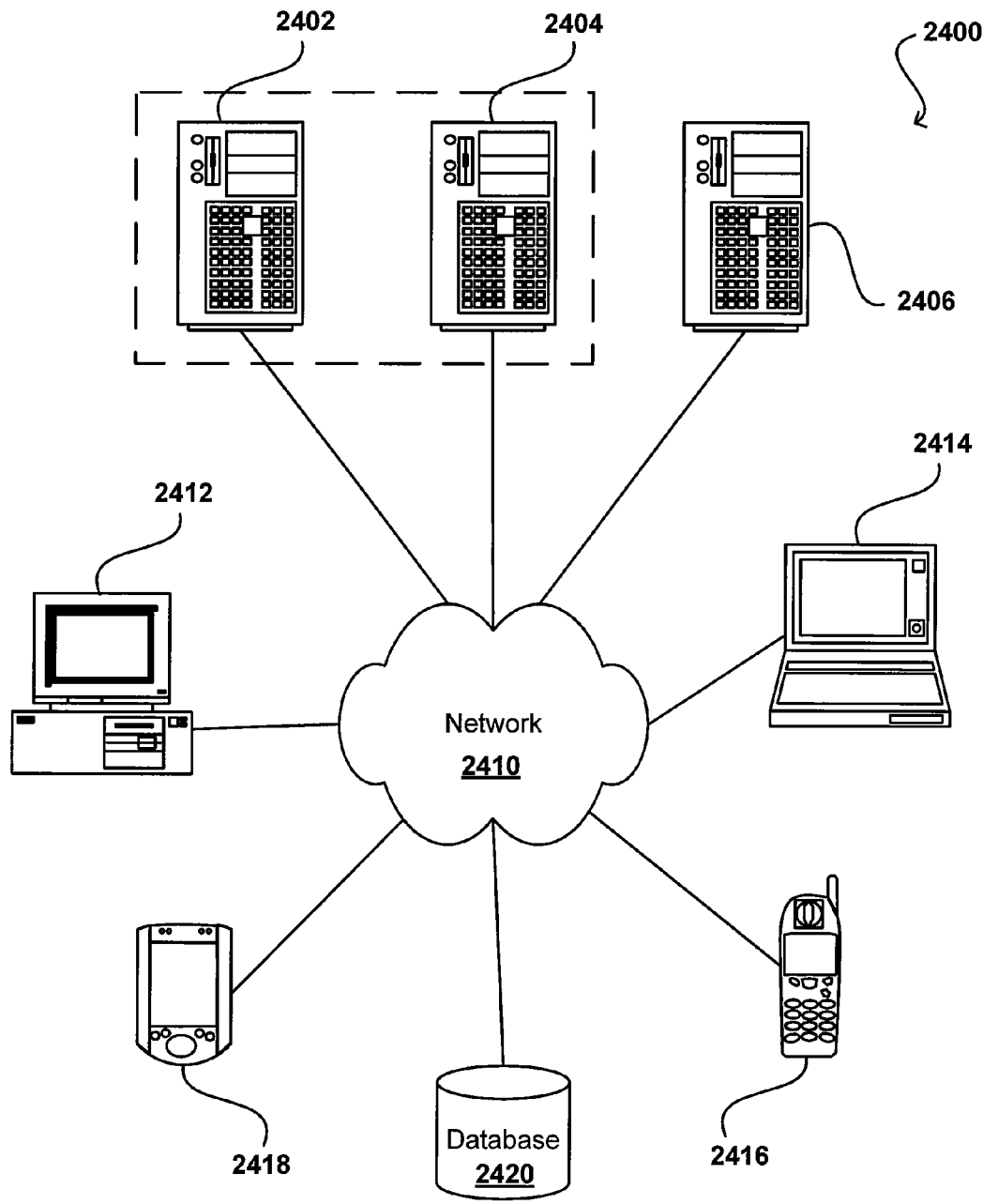
FIG. 24 is a block diagram of an embodiment of an operating environment.

An embodiment of an operation environment in which various embodiments presented herein may be implemented is shown in FIG. 24. The system 2400 can include one or more user computers, computing devices, or processing devices 2412, 2414, 2416, 2418, which can be used to operate a client, such as a dedicated application, web browser, etc. The user computers 2412, 2414, 2416, 2418 can be general purpose personal computers (including, merely by way of example, personal computers and/or laptop computers running a standard operating system), cell phones or PDAs (running mobile software and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 2412, 2414, 2416, 2418 may also have any of a variety of applications, including one or more development systems, database client and/or server applications, and Web browser applications. Alternatively, the user computers 2412, 2414, 2416, 2418 may be any other electronic device, such as a thin-client computer, Internet-enabled gaming system, and/or personal messaging device, capable of communicating via a network (e.g., the network 2410 described below) and/or displaying and navigating Web pages or other types of electronic documents. Although the exemplary system 2400 is shown with four user computers, any number of user computers may be supported.

In most embodiments, the system 2400 includes some type of network 2410. The network may be any type of network familiar to those skilled in the art that can support data communications using any of a variety of commercially-available protocols, including without limitation TCP/IP, SNA, IPX, AppleTalk, and the like. Merely by way of example, the network 2410 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, GRPS, GSM, UMTS, EDGE, 2G, 2.5G, 3G, 4G, Wimax, WiFi, CDMA 2000, WCDMA, the Bluetooth protocol known in the art, and/or any other wireless protocol); and/or any combination of these and/or other networks.

The system may also include one or more server computers 2402, 2404, 2406 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 2406) may be dedicated to running applications, such as a business application, a Web server, application server, etc. Such servers may be used to process requests from user computers 2412, 2414, 2416, 2418. The applications can also include any number of applications for controlling access to resources of the servers 2402, 2404, 2406.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 2412, 2414, 2416, 2418. As one example, a server may execute one or more Web applications. The Web application may be implemented as one or more scripts or programs written in any programming language, such as Java®, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 2412, 2414, 2416, 2418.

The system 2400 may also include one or more databases 2420. The database(s) 2420 may reside in a variety of locations. By way of example, a database 2420 may reside on a storage medium local to (and/or resident in) one or more of the computers 2402, 2404, 2406, 2412, 2414, 2416, 2418. Alternatively, a database 2420 may be remote from any or all of the computers 2402, 2404, 2406, 2412, 2414, 2416, 2418, and/or in communication (e.g., via the network 2410) with one or more of these. In a particular set of embodiments, the database 2420 may reside in a storage-area network ("SAN") familiar to those skilled in the art. Similarly, any necessary files for performing the functions attributed to the computers 2402, 2404, 2406, 2412, 2414, 2416, 2418 may be stored locally on the respective computer and/or remotely, as appropriate. In one set of embodiments, the database 2420 may be a relational database, such as Oracle 10g, that is adapted to store, update, and retrieve data in response to SQL-formatted commands.

Figure 25:
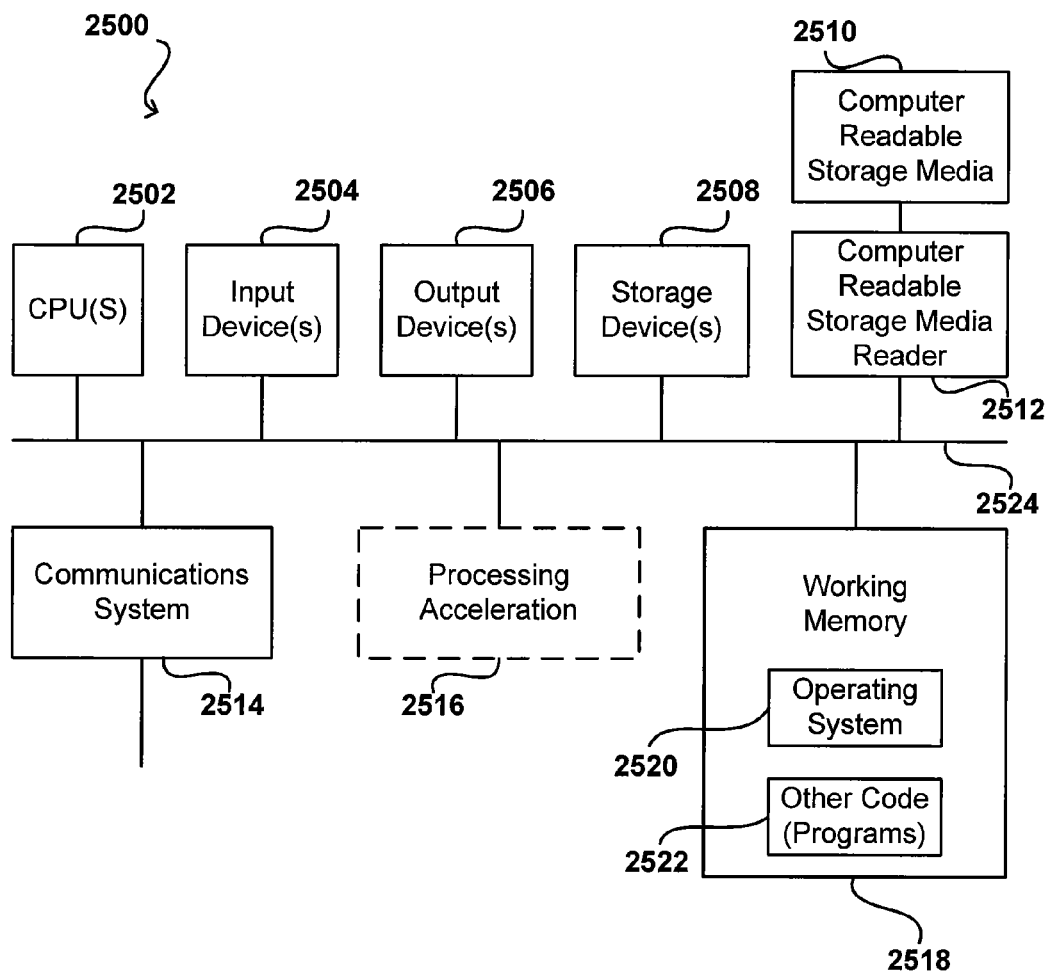
FIG. 25 is a block diagram of an embodiment of an computer system.

An embodiment of an exemplary computer system 2500, in which various embodiments presented herein may be implemented is shown in FIG. 25. The system 2500 may be used to implement any of the computer systems described above. The computer system 2500 is shown comprising hardware elements that may be electrically coupled via a bus 2524. The hardware elements may include one or more central processing units (CPUs) 2502, one or more input devices 2504 (e.g., a mouse, a keyboard, etc.), and one or more output devices 2506 (e.g., a display device, a printer, etc.). The computer system 2500 may also include one or more storage devices 2508. By way of example, the storage device(s) 2508 can include devices such as disk drives, optical storage devices, solid-state storage device such as a random access memory ("RAM") and/or a read-only memory ("ROM"), which can be programmable, flash-updateable and/or the like.

The computer system 2500 may additionally include a computer-readable storage media reader 2512, a communications system 2514 (e.g., a modem, a network card (wireless or wired), an infra-red communication device, etc.), and working memory 2518, which may include RAM and ROM devices as described above. In some embodiments, the computer system 2500 may also include a processing acceleration unit 2516, which can include a digital signal processor ("DSP"), a special-purpose processor, and/or the like.

The computer-readable storage media reader 2512 can further be connected to a computer-readable storage medium 2510, together (and, optionally, in combination with storage device(s) 2508) comprehensively representing remote, local, fixed, and/or removable storage devices plus storage media for temporarily and/or more permanently containing, storing, transmitting, and retrieving computer-readable information. The communications system 2514 may permit data to be exchanged with the network and/or any other computer described above with respect to the system 2500.

The computer system 2500 may also comprise software elements, shown as being currently located within a working memory 2518, including an operating system 2520 and/or other code 2522, such as an application program (which may be a client application, Web browser, mid-tier application, RDBMS, etc.). It should be appreciated that alternate embodiments of a computer system 2500 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

Several advantages of the embodiments presented herein are readily apparent. An advantage to such an approach over previous solution attempts is that a manager can delegate to anyone within an organization and is not limited to persons with certain roles or security access parameters. The security rights will be assigned for the proxy when the delegated authority becomes active. The manager is free to choose anybody, and the system can provide a selected proxy with any additional security needed to perform the tasks under the delegated authority. Such an approach addresses the fact that not all users have the same security access, but it may be desirable to delegate to an appropriate person (e.g., an assistant manager in the same department) that might not otherwise have the same security access (e.g., as a manager who might be in a different department). By default, a manager can be presented with potential proxies who report to the manager, or to whom the manager reports, but the manager also is able to choose someone outside this reporting hierarchy. And when the delegated authority becomes inactive or revoked, the additional security access will be removed such that the appropriate security roles are maintained.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A method of delegating authority for approving transactions, the method comprising:
receiving, by a computer system, a selection of a manager having authority to approve a plurality of transaction types that are submitted by members of a personnel group;
receiving, by a computer system, a selection of a proxy user who does not have authority to approve one or more of the plurality of transaction types that are submitted by members of the personnel group;
receiving, by a computer system, delegated transaction types, comprising a selection of one or more of the plurality of transaction types;
activating, by the computer system, the authority for the proxy user to approve transactions that are:
classified as one or more of the delegated transaction types, and
submitted by a member of the personnel group;
in response to activating the authority, automatically providing, by the computer system, additional security access to the proxy user;
revoking, by the computer system, the authority for the proxy user; and
in response to revoking the authority, removing, by the computer system, the additional security access for the proxy user.

2. The method as defined in claim 1, further comprising:
sending a request to the proxy user; and
providing a user interface to the proxy user to allow the proxy user to decide whether to accept the request to receive the authority.

3. The method as defined in claim 2, further comprising receiving a selection from the proxy user to accept the authority.

4. The method as defined in claim 3, further comprising:
updating a delegation table to record the authority for the proxy user; and
updating the delegation table to provide the security access for the proxy user.

5. The method as defined in claim 1, further comprising receiving a selection from the proxy user to reject the authority.

6. The method as defined in claim 5, further comprising notifying the manager that the proxy user rejected the authority.

7. The method as defined in claim 1, wherein the authority has a start date and an end date, wherein the authority is activated on the start date and revoked on the end date.

8. The method as defined in claim 1, further comprising receiving a selection of one or more transactions for which the proxy user will have authority to manage.

9. A computer readable memory device having stored thereon instructions which, when read and executed by a processor of a computer system, cause the computer system to execute a method for providing delegated approval for a transaction, by:
receiving a transaction request from a user who is a member of a personnel group;
determining a manager to approve the transaction, wherein the manager has authority to approve a plurality of transaction types that are submitted by members of the personnel group;
determining a transaction type of the transaction;
determining that the manager has selected delegated transaction types from the plurality of transaction types;
determining that the delegated transaction types include the transaction type of the transaction;
determining whether the manager has delegated authority to a proxy to approve transactions of the delegated transaction types on behalf of the manager, wherein:
the proxy previously did not have authority to approve transactions of the delegated transaction types that were submitted by members of the personnel group; and
sending the transaction to the proxy if the proxy was selected to approve transactions of the delegated transaction types.

10. The computer readable memory device as defined in claim 9, further comprising sending the transaction to the manager if there is no proxy selected to handle approval of the transaction.

11. The computer readable memory device as defined in claim 9, wherein determining whether a proxy is selected comprises:
calling a data model to determine if a proxy record exists;
accessing one or more delegation tables to locate the proxy record; and
returning one or more proxy records associated with the manager and the transaction.

12. The computer readable memory device as defined in claim 9, further comprising receiving an approval from the proxy for the transaction.

13. The computer readable memory device as defined in claim 12, wherein the manager reverses the approval.

14. The computer readable memory device as defined in claim 9, further comprising receiving a denial from the proxy for the transaction.

* * * * *

UNITED STATES PATENT AND TRADEMARK OFFICE
CERTIFICATE OF CORRECTION

PATENT NO. : 8,321,919 B2
APPLICATION NO. : 12/170130
DATED : November 27, 2012
INVENTOR(S) : Babeanu et al.

Page 1 of 1

It is certified that error appears in the above-identified patent and that said Letters Patent is hereby corrected as shown below:

In column 11, line 6-7, delete "and or" and insert -- and/or --, therefor.

In column 13, line 34, delete "GRPS," and insert -- GPRS, --, therefor.

Signed and Sealed this
Twelfth Day of March, 2013

Teresa Stanek Rea
*Acting Director of the United States Patent and Trademark Office*